3,245,755
PREPARATION OF SODA ASH FROM TRONA WITH REDUCTION OF IRON IMPURITY
Harold J. Comer, Green River, Wyo., and Alan B. Gancy, Princeton, N.J., assignors, by mesne assignments, to Intermountain Research & Development Corporation, Cheyenne, Wyo., a corporation of Wyoming
Filed Nov. 7, 1962, Ser. No. 235,999
7 Claims. (Cl. 23—63)

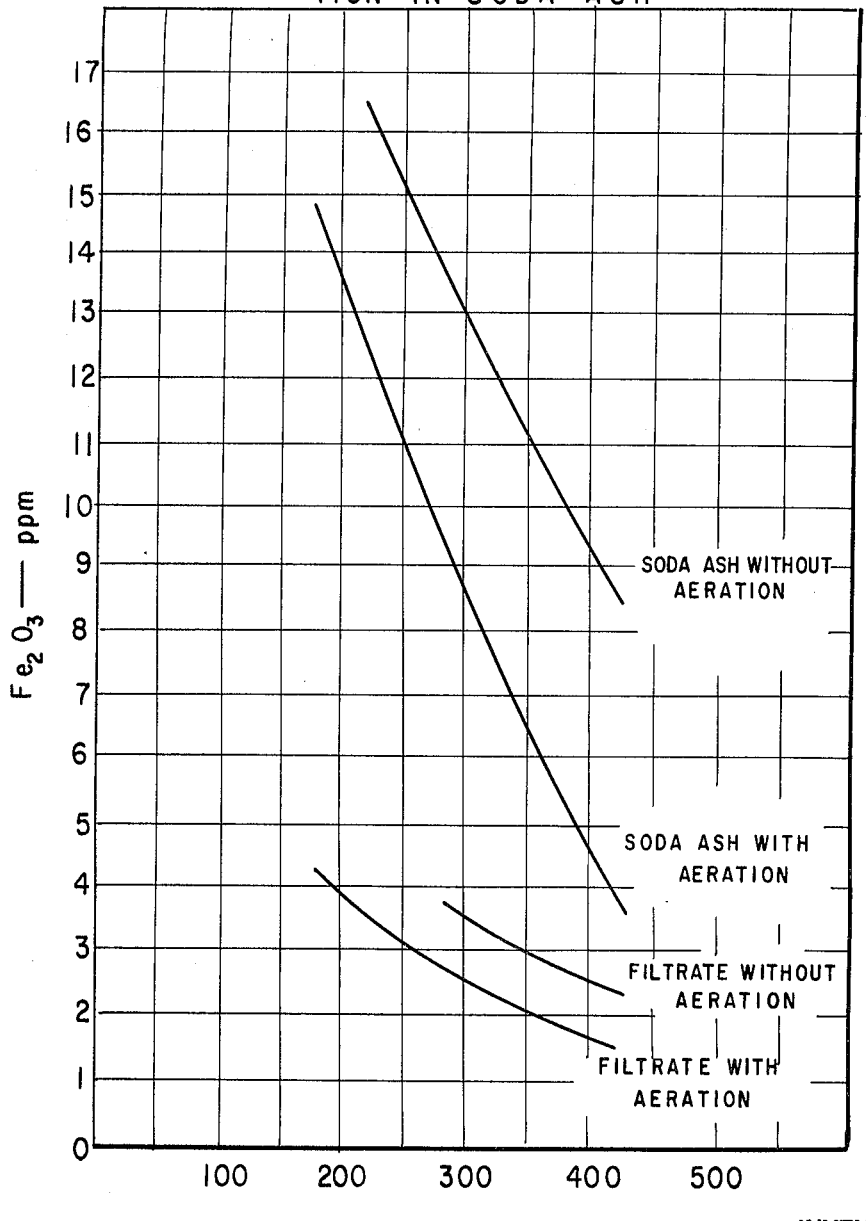

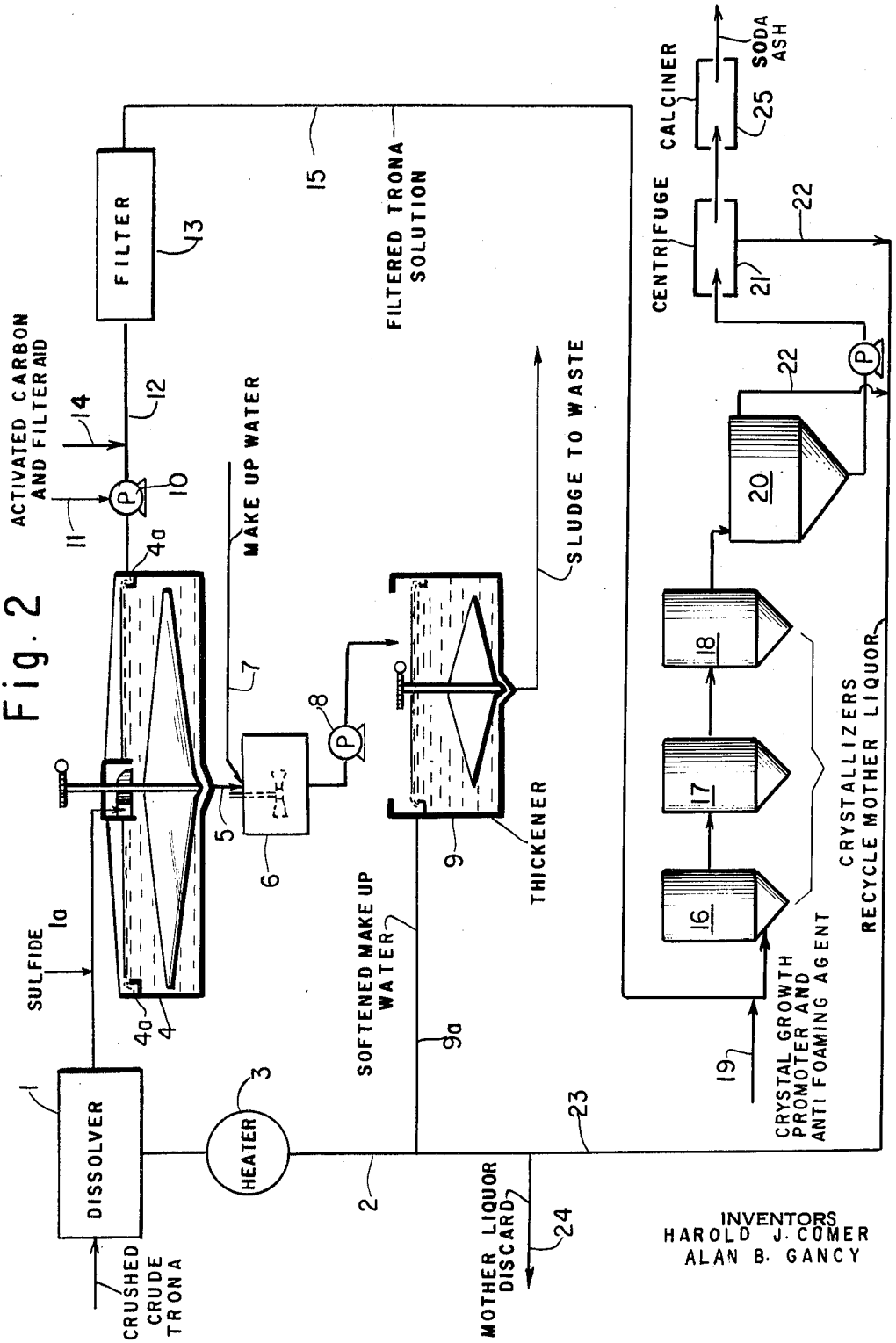

The invention relates to an improved process for the preparation of soda ash from crude trona as found in Sweetwater County, Wyoming, and similar trona deposits found in other parts of the world. The invention also relates to the intermediate preparation of a pure crystalline sodium sesquicarbonate or other forms of sodium carbonate crystallized from solutions of crude trona or crude calcined trona.

The trona deposits in Sweetwater and adjacent counties in Wyoming are found at depths ranging from 1100 feet to 1800 feet underground, and consist of a main trona bed varying from 8 to 18 feet in thickness and other beds of smaller thickness. The principal component of trona is sodium sesquicarbonate $$(Na_2CO_3 \cdot NaHCO_3 \cdot 2H_2O)$$

with varying amounts of organic and inorganic impurities. A typical analysis of the crude trona from which the larger pieces of shale have been removed is:

| Constituent: | Percent |
| --- | --- |
| $Na_2CO_3$ | 45.11 |
| $NaHCO_3$ | 35.75 |
| $H_2O$ | 15.32 |
| $NaCl$ | 0.03 |
| $Na_2SO_4$ | 0.01 |
| $Fe_2O_3$ (total) | 0.11 |
| Insolubles | 3.75 |

The iron content of the crude trona ranges from 0.10% to 0.26% and averages about 0.2%, calculated as $Fe_2O_3$.

In the preparation of pure crystalline sodium sesquicarbonate and other crystallized sodium carbonates from crude trona mineral, heavy impurities—and particularly iron compounds—have proven very undesirable and have caused considerable difficulty in the process. The principal difficulty of the presence of the iron compounds is that they are carried through the process and are crystallized with the sodium sesquicarbonate or other sodium carbonate crystals and carried into the sodium carbonate (soda ash) made by calcining the sodium sesquicarbonate or other sodium carbonate crystals, thereby contaminating the final soda ash and causing undesirable discoloration of the product. Iron discoloration in soda ash makes it unsuitable for many commercial purposes, such as glassmaking, textile operations, etc. Efforts to eliminate such impurities have only been partially successful and necessitated burdensome and costly operational steps.

It is an object of the invention to provide an improved process for the preparation of crystalline sodium sesquicarbonate and other forms of crystallized sodium carbonate from trona.

It is another object of the invention to provide a process for the preparation of crystalline sodium sesquicarbonate and other forms of sodium carbonate having a low iron content.

These and other objects and advantages of the invention will become obvious from the following detailed description.

In the crystallization of sodium carbonate from solutions of crude trona, the crystallization may be carried out to produce crystals of sodium sesquicarbonate, sodium bicarbonate, sodium carbonate monohydrate, anhydrous sodium carbonate, and other forms of sodium carbonate crystals which are subsequently calcined or dried to produce soda ash. This invention is applicable to all crystallizations of sodium carbonate crystals from solutions obtained from crude trona by evaporative crystallization or evaporative cooling crystallization, and the term "crystallizing sodium carbonate" as used herein is intended to cover the crystallization of all forms of sodium carbonate crystals such as sodium sesquicarbonate, sodium bicarbonate, sodium carbonate monohydrate, anhydrous sodium carbonate and other forms of sodium carbonate crystals from solutions of crude trona or calcined crude trona by such crystallization methods.

The first step in one method of processing of trona is to dissolve the prepared mineral in hot water, or more accurately in a mixture of hot water and mother liquor from the sesquicarbonate crystallization step. This hot solution made up at the dissolvers contains about 25% dissolved solids, chiefly sodium sesquicarbonate, and has a near-boiling temperature of about 98° C., which is the practical maximum obtainable at the atmospheric pressure existing at the Rocky Mountain area elevation. This hot solution is pumped to clarifiers where some of the insolubles are removed, then upon addition of activated charcoal and filtration of the solution as described in said Patent Nos. 2,346,140, 2,639,217 and 2,770,524, cooled preferably in multiple effect vacuum crystallizers to effect crystallization, and the sesquicarbonate crystals or other sodium carbonate crystals are removed by centrifuging. The mother liquor from the centrifuges after the addition of makeup water is returned to the dissolvers and the crystals are calcined to soda ash.

During the dissolving step iron is dissolved from the trona and the shale associated with the crude trona. Most of the dissolved iron comes from the shale, particularly the darker shale, but it is impossible to effectively separate the shale prior to the dissolving operation.

Other methods of processing trona to prepare soda ash comprises (1) calcining the crude trona to crude soda ash, dissolving the crude soda ash in hot water and/or mother liquor, clarifying the resulting solution to remove insolubles, filtering the clarified solution, crystallizing sodium carbonate monohydrate crystals or anhydrous sodium carbonate crystals from the filtered solution and recovering the said crystals and (2) dissolving crude trona in a hot aqueous solution, clarifying the resulting solution to remove insolubles, filtering the clarified solution, carbonating the filtered solution, crystallizing sodium bicarbonate therefrom and recovering the said crystals. Sodium carbonate containing solutions can be prepared by other known methods.

The iron content in sodium carbonate solutions has been reduced by the addition of sulfide to the sodium carbonate solution in sufficient amounts to maintain a sulfide concentration of 100 to 1000 p.p.m., preferably 300 to 500 p.p.m., in the said carbonate solution during processing. The carbonate solution produced in this manner has a low iron content, usually about 3 to 4 p.p.m. Since the amount of iron in the final soda ash is about four times the amount of iron calculated as $Fe_2O_3$ in the crystallizer solution, the use of sulfide gives a soda ash with an iron content of about 12 to 16 p.p.m. However, for many commercial uses of soda ash it is desirable to have an iron content of less than 10 p.p.m.

We have found that about a 50% reduction of the iron content in the soda ash obtained from sulfide containing sodium carbonate solutions can be obtained by aerating the sodium carbonate solution from the clarifiers before filtration with air, oxygen or oxygen enriched air. The aeration step is believed to oxidize the iron in solution to a more insoluble form causing the iron to precipitate out. The precipitated iron is removed in the filtration step. The amount of iron in the carbonate solution is thereby reduced and effects a corresponding reduction in the amount of iron in the final soda ash product.

In the accompanying drawings:

FIG. 1 shows the amount of iron present for varying sulfide concentrations in trona solution with and without aeration; and FIG. 2 illustrates diagrammatically one form of a cyclical process for the production of soda ash from crude trona in which our invention is used.

FIG. 1 compares the amount of iron in the filtrate and soda ash with the amount of sulfide in the solution with and without aeration of the trona solution from the clarifiers. While the iron content in the filtrate is reduced by only about 1 or 2 p.p.m., the iron content in the final soda ash is reduced up to about 50%. For example, at a sulfide concentration of about 400 p.p.m., the iron content of the filtrate, calculated as $Fe_2O_3$ is about 2.7 p.p.m. without aeration and about 1.7 p.p.m. when the solution is aerated. However, the final soda ash from the aerated solution only contains about 4.6 p.p.m. of iron as compared to about 9.3 p.p.m. of iron in the soda ash produced from the said solution without aeration.

To demonstrate the effect of aeration on the solubility of iron in trona solutions, samples of trona solutions were taken from the plant liquors just before the crystallizers and the samples were cooled from 95° C. to 40° C. which is the same degree of cooling effected in the three-stage crystallizers. The non-aerated solutions still contained 85% of the iron originally dissolved therein while the aerated solutions only had about 30% of the iron originally dissolved therein. While these results cannot be compared directly with the plant process because of the volatilization of sulfide and water in the plant crystallizers, the test clearly shows that aeration of trona solutions reduces the solubility of iron therein.

The sodium carbonate solutions should be aerated after the clarifiers and before the filtration stop. If the sodium carbonate solution from the dissolvers is aerated before passing into the clarifiers, there is considerable foaming in the clarifiers which interferes with the liquor clarification. Aeration of the sodium carbonate solution in the clarifier overflow well is not successful since the pumps from the clarifier become airbound and cause the liquor to back up in the clarifiers. If the solution is aerated in the vacuum crystallizers, the solubility of the iron is decreased and iron is precipitated with the sodium carbonate crystals thereby increasing the iron contamination.

If air is used to aerate the sodium carbonate solution, the volume of air used is preferably between 2 and 4 cubic feet of air per minute for each 1000 gallons per minute of solution flow. If too low a volume of air is used, there is insufficient aeration, and if too great a volume of air is used, the sulfide is oxidized and the amount of sulfide in the solution is correspondingly reduced. With the proper volume of air, the oxidation of sulfide amounts to only about 3%. Smaller volumes may be used when employing oxygen or oxygen enriched air.

The solution aeration and the sulfide addition not only reduce the amount of iron present in the soda ash, they also improve the color of the sodium sequicarbonate crystals and a very pure crop of crystals is produced if the solution is only cooled to 60° C.

A preferred manner of practicing our invention is illustrated in FIG. 2 wherein the crushed crude trona as removed from the mine is introduced into insulated dissolving tanks 1 in which it is contacted with recycling mother liquor from line 2, which has been reheated to about 100° C. in heater 3. From the dissolvers 1 the trona solutions carrying insoluble material therein flows into insulated clarifiers 4 in which most of the mud and slime settles out and is removed through the underflow line 5 into a head tank 6. The mud and slime discharged from clarifier 4 is about 30 to 40% solids. Makeup water is introduced at 7 and is thoroughly mixed with the muds by pump 8 and pumped into the center of insulated thickener 9 from the bottom of which the sludge is discharged to waste and the clarified overflow, containing trona values dissolved by the makeup water, and the now softened makeup water flows through the line 9a and is added to the recycle mother liquor flowing into the heater 3. The makeup water having an average total hardness of about 120 p.p.m. calculated as calcium in contact with the trona insolubles in thickener 9 is softened to a hardness of about 16 p.p.m. in the thickener 9 and the calcium precipitated as calcium carbonate is discharged from the system with the sludge.

Sulfide, preferably in the form of sodium sulfide or sodium hydrosulfide is added, as indicated at 1a, to the crude trona solution flowing from the dissolvers 1 in an amount sufficient to maintain the sulfide concentration in the recycle mother liquor preferably between 200 and 400 parts per million (p.p.m.) in the plant liquor solution based upon the weight of the solution, although this amount may vary between 100 and 1000 p.p.m.

The clarified trona solution overflowing from the weir 4a of the clarifier 4 is pumped by clarifier overflow pump 10 through line 12 to the filter station 13. Air is added through line 11 to the trona solution as it is discharged from the pump 10 preferably at a rate of 4 cubic feet of air per minute for each 1000 gallons per minute of the solution flow.

A filter aid and activated carbon are introduced prior to filtration as indicated at 14 and after filtration the hot trona solution flows through the line 15 to the vacuum crystallizers 16, 17 and 18 where the temperature of the solution is reduced to about 40° C. to crystallize sodium sesquicarbonate therefrom. Just prior to introduction into the crystallizer system, a crystallization promoter preferably from the group consisting of (1) alkyl benzene sulfonates containing at least 8 alkyl carbon atoms, (2) alkyl naphthalene sulfonates containing at least 4 alkyl carbon atoms, (3) primary alkyl alcohol sulfates containing at least 10 carbon atoms, and (4) N-substituted taurines of the formula $R'R''NCH_2CH_2SO_3M$ where $R'$ is a hydrocarbon radical, $R''$ is the acyl radical of a higher fatty acid and M is an alkali metal, and a defoaming agent may be added as indicated at 19. Other anionic crystallization promoting agents may be used. The crystallization promoter is preferably used in amounts of 5 to 100 p.p.m. and increases the particle size of the sodium carbonate produced without a crystallization promoter from about 40% plus 100 mesh to about 70% (preferably above 80%) plus 100 mesh when a crystallization promoter is used.

From the last crystallizer the crystal slurry goes to a crystal settler 20, from which a crystal slurry is pumped to a centrifuge station 21 where the crystals of the sodium sequicarbonate are separated from the mother liquor and the mother liquor overflowing from the crystal settler 20 and from the centrifuges is recycled through the lines 22 and 23 to the heater 3 where it is reheated and used to dissolve more crude trona. In order to maintain the proper balance of sodium carbonate to sodium bicarbonate in the recirculating mother liquor, a portion of the recirculating mother liquor may be withdrawn and discarded as a purge or processed in other ways to recover the soda values therein, as indicated at 24. From the centrifuge station 21 the sodium sesquicarbonate crystals are conveyed to calciners 25 where they are calcined to soda ash. It is to be understood that the overall process has been described only in a diagrammatic way, that many details have been omitted for the sake of clarity and that where only one dissolver, one clarifier, one filter, etc., having been indicated, multiples of such units may be used.

Normal sodium sulfide, $Na_2S$, is the preferred form for adding sulfide since a foreign cation is not involved.

The same desirable result is obtained by the use of sodium hydrosulfide or hydrogen sulfide. The use of soluble sulfides of other cations is operative but has the objectionable feature of introducing the different cation. Sulfur itself is suitable to the extent that it dissolves in the hot process liquors.

The aeration of the trona solution after clarification and before filtration gives a soda ash with a lower iron content at a lower sulfide concentration as compared to the soda ash obtained without aeration. This is illustrated in Table I which summarizes the average monthly iron content calculated as $Fe_2O_3$ in soda ash before and after aeration over a period of months. The data for the first three months was obtained from actual plant liquors without aeration while the data for the next three months was obtained from actual plant liquors with aeration.

TABLE I

| Month | Amount of sulfide in filtrate in p.p.m. | Amount of iron in soda ash calculated as $Fe_2O_3$ |
|---|---|---|
| First | 371 | 15 |
| Second | 355 | 11 |
| Third | 344 | 13 |
| Fourth | 343 | 7 |
| Fifth | 339 | 8 |
| Sixth | 293 | 9.6 |

*Example*

For a plant producing 100,000 tons of soda ash per year according to the embodiment of the invention illustrated and described in connection with FIG. 2, the following material balance in Table II is maintained.

TABLE II

| Material | Pounds of material, per hour |
|---|---|
| Mother liquor to dissolvers | 268,000 |
| Crude crushed trona to dissolvers | 42,000 |
| Solution and muds to clarifier | 310,000 |
| Clarifier underflow | 12,000 |
| Solution to filters | 298,000 |
| First stage crystallizer —80° C.: | |
|   Crystals formed | 14,000 |
|   Water evaporated | 7,000 |
|   Solution to second stage crystallizer | 277,000 |
| Second stage crystallizer —60° C.: | |
|   Crystals formed | 13,000 |
|   Water evaporated | 9,000 |
|   Solution to third stage crystallizer | 255,000 |
| Third stage crystallizer —40° C.: | |
|   Crystals formed | 9,000 |
|   Water evaporated | 8,000 |
|   Solution to centrifuge | 238,000 |
| Centrifuge: | |
|   Crystals recovered | 36,000 |
|   Mother liquor | 238,000 |
| Mother liquor recycle: | |
|   Mother liquor from centrifuge | 238,000 |
|   Makeup water | 16,000 |
|   Condensed vapors from crystallizer | 14,000 |
| Soda ash from calciners | 25,000 |

Various modifications of the process of the invention may be made without departing from the spirit or scope thereof and it is to be understood that the invention is to be limited only as defined in the appended claims.

We claim:

1. A process for the preparation of soda ash having an iron content of less than 10 p.p.m. from crude trona which comprises forming an aqueous solution containing sodium carbonate from crude trona, adding sufficient soluble sulfide to the aqueous solution containing sodium carbonate to obtain a concentration of 100 to 1000 p.p.m. of sulfide in the said aqueous solution, clarifying the said aqueous solution to remove insolubles therefrom, aerating the clarified aqueous solution containing sodium carbonate with an oxygen containing gas to precipitate iron therefrom, filtering the aerated solution, cooling the filtered solution to crystallize sodium carbonate therefrom, separating the sodium carbonate crystals from the mother liquor and calcining the sodium carbonate crystals to soda ash having less than 10 p.p.m. of iron and recovering the soda ash.

2. A process for the preparation of soda ash having an iron content of less than 10 p.p.m. from crude trona which comprises dissolving crude trona in a hot aqueous solvent, adding sufficient soluble sulfide to the resulting trona solution to obtain a concentration of 100 to 1000 p.p.m. of sulfide in the trona solution, clarifying the latter to remove insolubles therefrom, aerating the clarified trona solution with an oxygen containing gas to precipitate iron therefrom, filtering the aerated trona solution, cooling the filtered trona solution to form a slurry of sodium sesquicarbonate crystals in a mother liquor, separating the mother liquor from the sodium sesquicarbonate crystals, calcining the sodium sesquicarbonate crystals to soda ash having less than 10 p.p.m. of iron and recovering the soda ash.

3. A process for the preparation of soda ash having an iron content of less than 10 p.p.m. from crude trona which comprises calcining crude trona to crude soda ash, dissolving the crude soda ash in a hot aqueous solvent, adding sufficient soluble sulfide to the resulting solution to obtain a sulfide concentration of 100 to 1000 p.p.m., clarifying the resulting solution to remove insolubles therefrom, aerating the clarified solution with an oxygen containing gas, filtering the aerated solution, cooling the filtered solution to form a slurry of sodium carbonate monohydrate crystals in mother liquor, separating the sodium carbonate crystals from the mother liquor, calcining the sodium carbonate monohydrate crystals to soda ash having an iron content of less than 10 p.p.m. and recovering the soda ash.

4. A process for the preparation of soda ash from crude trona which comprises dissolving the crude trona containing insoluble material in a heated recycling mother liquor containing sulfide, adding sufficient soluble sulfide to the resulting trona solution to have 100 to 1000 p.p.m. sulfide in the trona solution, clarifying the latter to remove insoluble material from the trona solution, aerating the clarified trona solution with about 2 to about 4 cubic feet of air per minute for each 1000 g.p.m. of trona solution flow to precipitate iron therefrom, filtering the aerated trona solution, cooling the trona solution to form a slurry of sodium sesquicarbonate crystals in a trona mother liquor, separating the sodium sesquicarbonate crystals from the trona mother liquor, recycling the mother liquor to dissolve more crude trona, calcining the sodium sesquicarbonate crystals to soda ash and recovering the soda ash.

5. A process for the preparation of soda ash from crude trona which comprises dissolving the crude trona containing insoluble material in a heated recycling mother liquor containing sulfide, adding sufficient soluble sulfide to the resulting trona solution to have 100 to 1000 p.p.m. sulfide in the trona solution, clarifying the latter to remove insoluble material from the trona solution, aerating the clarified trona solution with about 2 to about 4 cubic feet of air per minute for each 1000 g.p.m. of trona solution flow to precipitate iron therefrom, filtering the aerated trona solution, adding a crystallization promoter to the hot trona solution, cooling the trona solution to form a slurry of sodium sesquicarbonate crystals in a trona mother liquor, separating the sodium sesquicarbonate crystals from the trona mother liquor, recycling and reheating the mother liquor to dissolve more crude trona, calcining the sodium sesquicarbonate crystals to soda ash and recovering the soda ash.

6. A process for the preparation of soda ash from crude trona which comprises dissolving crude trona containing insoluble material in a heated recycling mother liquor, adding a soluble sulfide containing material to the resulting trona solution, clarifying the trona solution to remove insoluble materials from the trona solution, aerating the clarified solution with about 2 to about 4 cubic feet of air per minute for each 1000 g.p.m. of trona solution flow to precipitate iron therefrom, filtering the trona solution, cooling the trona solution to form a slurry of sodium sesquicarbonate crystals in a trona mother liquor, separating the sodium sesquicarbonate crystals from the trona mother liquor, recycling and reheating the mother liquor to dissolve more crude trona, calcining the sodium sesquicarbonate crystals to soda ash and recovering the soda ash.

7. A process for the preparation of soda ash from crude trona which comprises dissolving crude trona containing insoluble material in a heated recycling mother liquor, adding a soluble sulfide containing material to the resulting trona solution, clarifying the trona solution to remove insoluble materials from the trona solution, aerating the clarified solution with about 4 cubic feet of air per minute for each 1000 g.p.m. of trona solution flow to precipitate iron therefrom, filtering the trona solution, vacuum cooling the trona solution to form a slurry of sodium sesquicarbonate crystals in a trona mother liquor, separating the sodium sesquicarbonate crystals from the trona mother liquor, recycling and reheating the mother liquor to dissolve more crude trona, calcining the sodium sesquicarbonate crystals to soda ash and recovering the soda ash.

References Cited by the Examiner

UNITED STATES PATENTS

| | | | |
|---|---|---|---|
| 2,775,508 | 12/1956 | Thomsen | 23—61 |
| 3,084,026 | 4/1963 | Frint et al. | 23—63 X |
| 3,119,655 | 1/1964 | Frint et al. | 23—63 |

MAURICE A. BRINDISI, *Primary Examiner.*